United States Patent Office 3,488,367
Patented Jan. 6, 1970

3,488,367
ACTINIDE CYCLOPENTADIENYL COMPOUNDS AND THEIR PREPARATION
Ernst Otto Fischer, Munich-Solln, Franz Baumgartner, Neureut, Basil Kanellakopulos, Leopoldshafen, and Peter Laubereau, Munich, Germany, assignors to Gesellschaft fur Kernforschung mbH, a corporation of Germany
No Drawing. Filed Mar. 2, 1967, Ser. No. 619,924
Claims priority, application Germany, Mar. 4, 1966, G 46,216
Int. Cl. C07f; C01g 43/04, 57/00
U.S. Cl. 260—429.1                                8 Claims

ABSTRACT OF THE DISCLOSURE

Actinide cyclopentadienyl compounds are prepared by reacting actinide halides with certain metal cyclopentadienyl compounds at relatively low temperatures in the melt. The product actinide cyclopentadienyl compound is recovered from the reaction mass by sublimation.

---

A number of methods of separating actinides from admixtures, especially of nuclear fuel materials from fission products, are known. Mostly, these methods use strongly corrosive agents, such as oxidizing alkaline melts, acid or alkaline solutions and the like. Moreover, high temperatures are often applied in these processes, for instance temperatures up to 500° C. in the alkaline melts.

Of course, the processes can be carried out easier, the more the temperature is made to approach normal temperature and the less corrosive properties the materials used have. Therefore, it is the aim of the invention to create a very simple process of actinide separation operating at relatively low temperatures in which the compound into which the substance to be separated is transformed has as little corrosive action as possible.

In the invention, this is achieved by a method of separating the actinides from admixtures and/or various actinides from each other, especially for the reprocessing of spent nuclear fuels, by separating the actinides as cyclopentadienyl compounds from the admixtures and/or from each other. Here, e.g., the actinide-cylopentadienyl compounds can be separated from the admixtures by extraction with organic solvents or by fractionated volatilization. Particularly the cyclopentadienyl compound of various actinides can be separated from each other by fractionated volatilization. In this way it is possible, e.g., to separate uranium from putonium.

The actinide cyclopentadienyl compounds can be prepared according to the invention by making the actinides react as halides with cyclopentadienyl compounds of partially ionogenic structure, preferably in the melt of these. Because of its low melting point of some 60° C., di-cyclopentadienyl beryllium is particularly suited as such a cyclopentadienyl compound of partially ionogenic structure.

The advantage of the method according to the invention lies in the fact that cyclopentadienyl compounds of the actinides are stable under the exclusion of oxygen and moisture, can be sublimed in the high vacuum at some 100 to 250° C. and have practically no corrosive action upon the walls of the reaction vessels. The recovery of the oxides of the actinides is also possible in a simple way, namely by treating the cyclopentadienyl compound, e.g., with oxidizing agents in the solution, by reducing the volume of the solution afterwards and igniting thereafter. Moreover, a recovery can be brought about by simple igniting of the cyclopentadienyl compounds in an oxidizing atmosphere, e.g. air, to provide the oxide in this way.

The method according to the invention can be applied most advantageously, if the actinides are converted into their cyclopentadienyl compounds by means of a cyclopentadienyl compound having a relatively low melting point, such as di-cyclopentadienyl beryllium or di-cyclopentadienyl tin or the like. It is possible to achieve good yields in these conversions, especially if the actinide to be converted is present as a halide. In the conversion, according to the invention, of actinides into their cyclopentadienyl compounds only simple chemical equipment and but little space is required. Moreover, no extreme reaction conditions are necessary.

Carrying out the reaction in the melt and subliming afterwards offer the advantage that here, contrary to many other methods, no highly volatile or highly flammable materials or solvents have to be used which are sensitive to the radiation emitted by radioactive substances, i.e. radiolytically sensitive.

If the actinides to be subjected to the method according to the invention are irradiated nuclear fuels or fertile materials, e.g. uranium or plutonium, it is possible, on the one hand, to separate the nuclear fuels from the fission products and, on the other hand, to separate various nuclear fuels from each other. Here, the insensitivity of these materials to radiolytical decomposition is a particular advantage. Also the other advantages mentioned above are significant, because this reprocessing of spent nuclear fuels is carried out partly by remote control, so simplicity and safety of the process are imperative. In the same way it is possible to apply the method according to the invention also to fertile nuclear materials, e.g. thorium.

By making plutonium metal react with chlorine and $CCl_4$ at 880° C. pure emerald $PuCl_3$ was obtained which continued the reaction in a melt of $Be(C_5H_5)_2$ around 70° C. to form tri-cyclopentadienyl plutonium. The moss-green compound formed according to the reaction equation

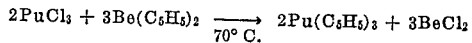

could be isolated from the reaction mixture at a yield higher than 60% after sublimation of the excess and more highly volatile $Be(C_5H_5)_2$ in the high vacuum at 140–165° C. on a water-cooled finger. The product obtained, which was completely free from chlorine, (Pu=55.03%, C=41.48% H=3.48%; found Pu=54.24% C=40.46%, H=3.48%) did prove to be sensitive to air and was attacked by argon-saturated water causing gas formation and the formation of a blue residue, by air-free 1 N HCl, and by half concentrated nitric acid with the formation of the blue solution of $Pu^{3+}$, but at room temperature this compound can be stored for weeks without undergoing any change if kept under an inert gas atmosphere. $Pu(C_5H_5)_3$ decomposes above 195° C. after having started to sinter from 180° C. on.

The data about materials, quantities and figures mentioned in the above examples are not meant to be any limitation of the invention. Rather can the method according to the invention be carried out successfully in a modified way under the guiding principles mentioned above. In particular, it is possible then to optimize the effects of preparation and separation by variation of the reaction conditions, such as temperature conditions, reaction time etc.

What we claim is:
1. Process for the production of actinide cyclopentadiene compounds, which comprises reacting an actinide halide with at least one agent selected from the group consisting of dicyclopentadienyl beryllium and dicyclopentadienyl tin, and recovering the actinide cyclopentadienyl compound thus formed."

2. Process claimed in claim 1 wherein said agent is dicyclopentadienyl beryllium.

3. Process claimed in claim 1, carried out in the melt.

4. Process claimed in claim 3, arried out at above about 60° C.

5. Process claimed in claim 3, including subliming the actinide cyclopentadienyl compound after formation.

6. Process claimed in claim 3, wherein said actinide is at least one member of the group consisting of uranium, plutonium, and thorium.

7. Process claimed in claim 5, wherein said sublimation is carried out at about 140 to 165° C. in a high vacuum.

8. Process claimed in claim 5, wherein more than one actinide metal is present, reacted with said agent, and transformed into a cyclopentadienyl compound prior to sublimation of at least one of said actinide cyclopentadienyl compounds.

References Cited

UNITED STATES PATENTS

| | | | |
|---|---|---|---|
| 2,818,416 | 12/1957 | Brown et al. | 260—429.2 |
| 3,071,605 | 1/1963 | Morehouse | 260—429.1 |
| 3,152,157 | 10/1964 | Shapiro et al. | 260—429.2 |

CARL D. QUARFORTH, Primary Examiner

MICHAEL J. McGREAL, Assistant Examiner

U.S. Cl. X.R.

23—326